(12) United States Patent
Saito

(10) Patent No.: US 9,162,362 B2
(45) Date of Patent: Oct. 20, 2015

(54) MANIPULATOR MECHANISM

(71) Applicant: Takashi Saito, Tokyo (JP)

(72) Inventor: Takashi Saito, Tokyo (JP)

(*) Notice: Subject to any disclaimer, the term of this patent is extended or adjusted under 35 U.S.C. 154(b) by 251 days.

(21) Appl. No.: 13/921,658

(22) Filed: Jun. 19, 2013

(65) Prior Publication Data
US 2013/0312565 A1 Nov. 28, 2013

Related U.S. Application Data

(62) Division of application No. 12/438,458, filed as application No. PCT/JP2007/066233 on Aug. 22, 2007, now Pat. No. 8,490,511.

(30) Foreign Application Priority Data

Aug. 23, 2006 (JP) ................................. 2006-226099

(51) Int. Cl.
| B25J 18/00 | (2006.01) |
| B25J 18/02 | (2006.01) |
| B25J 9/10 | (2006.01) |
| B25J 18/06 | (2006.01) |
| F16H 19/06 | (2006.01) |

(52) U.S. Cl.
CPC *B25J 18/02* (2013.01); *B25J 9/104* (2013.01); *B25J 18/06* (2013.01); *F16H 19/064* (2013.01); *Y10S 901/27* (2013.01); *Y10T 74/20323* (2015.01)

(58) Field of Classification Search
CPC ............ B25J 18/00; B25J 18/02; B25J 18/06; B25J 9/00; F16M 11/40; B65H 75/34
USPC ........ 74/490.01, 490.03, 490.04, 89.2, 89.21, 74/89.22; 901/21
See application file for complete search history.

(56) References Cited

U.S. PATENT DOCUMENTS 2,130,993 A 9/1938 Dubiller
3,016,988 A 1/1962 Browning
(Continued)

FOREIGN PATENT DOCUMENTS

| JP | 59-194108 A | 11/1984 |
| JP | 60-150996 A | 8/1985 |

(Continued)

OTHER PUBLICATIONS

International Search Report of PCT/JP2007/066233, Mailing Dated of Nov. 6, 2007.
(Continued)

*Primary Examiner* — Daniel Wiley
(74) *Attorney, Agent, or Firm* — Westerman, Hattori, Daniels & Adrian, LLP

(57) ABSTRACT

A manipulator mechanism according to the present invention comprises an arm 1 having a tip mechanism 3 attached to its tip part, and an arm paying out device 2 to which the base end part of the arm 1 is coupled for winding and paying out the arm 1. The arm 1 comprises a tape aggregate 4 formed by bundling a plurality of elastic tapes 41, and a plurality of bundling members 5 attached to the tape aggregate 4 with spaces therebetween in a longitudinal direction of the tape aggregate 4. The bundling member 5 is provided with a guiding groove 51, through which the plurality of tapes 41 pass, to keep the relative position of the plurality of tapes 41 constant.

3 Claims, 20 Drawing Sheets

(56) References Cited

U.S. PATENT DOCUMENTS

| | | |
|---|---|---|
| 3,213,573 A | 10/1965 | Bohr et al. |
| 3,371,801 A | 3/1968 | Widegren |
| 3,699,585 A | 10/1972 | Morrison |
| 3,975,581 A | 8/1976 | Lowenhar |
| 4,096,459 A | 6/1978 | Lowenhar |
| 4,426,650 A | 1/1984 | Korsen |
| 4,494,417 A | 1/1985 | Larson et al. |
| 5,056,278 A | 10/1991 | Atsukawa |
| 5,718,087 A | 2/1998 | Featherstone et al. |
| 6,112,474 A | 9/2000 | Paine |
| 7,891,145 B1 | 2/2011 | Bobbio |

FOREIGN PATENT DOCUMENTS

| | | |
|---|---|---|
| JP | 62-269001 A | 11/1987 |
| JP | 8-318483 A | 12/1996 |
| JP | 09-011178 A | 1/1997 |
| JP | 2002-323195 A | 11/2002 |
| WO | 9511394 A1 | 4/1995 |

OTHER PUBLICATIONS

European Search Report dated Apr. 16, 2010, issued in corresponding European Patent Application No. 07792832.3.

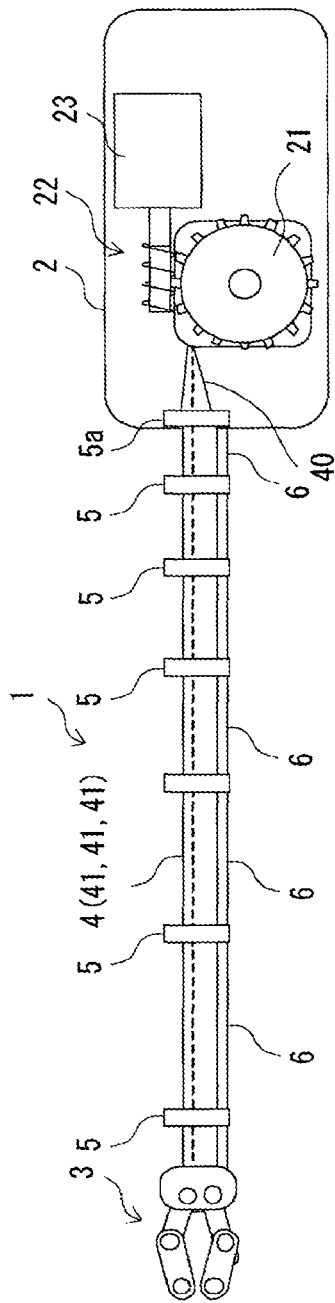
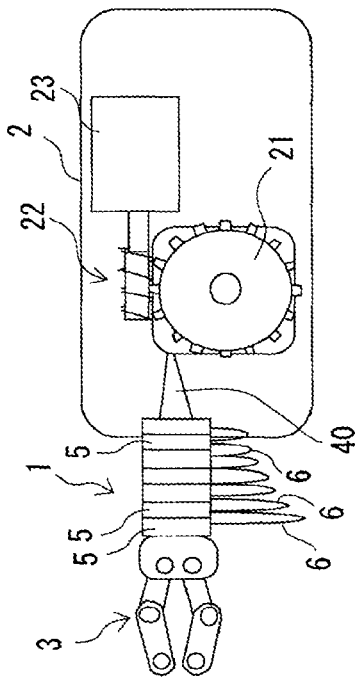
FIG. 1A
FIG. 1B

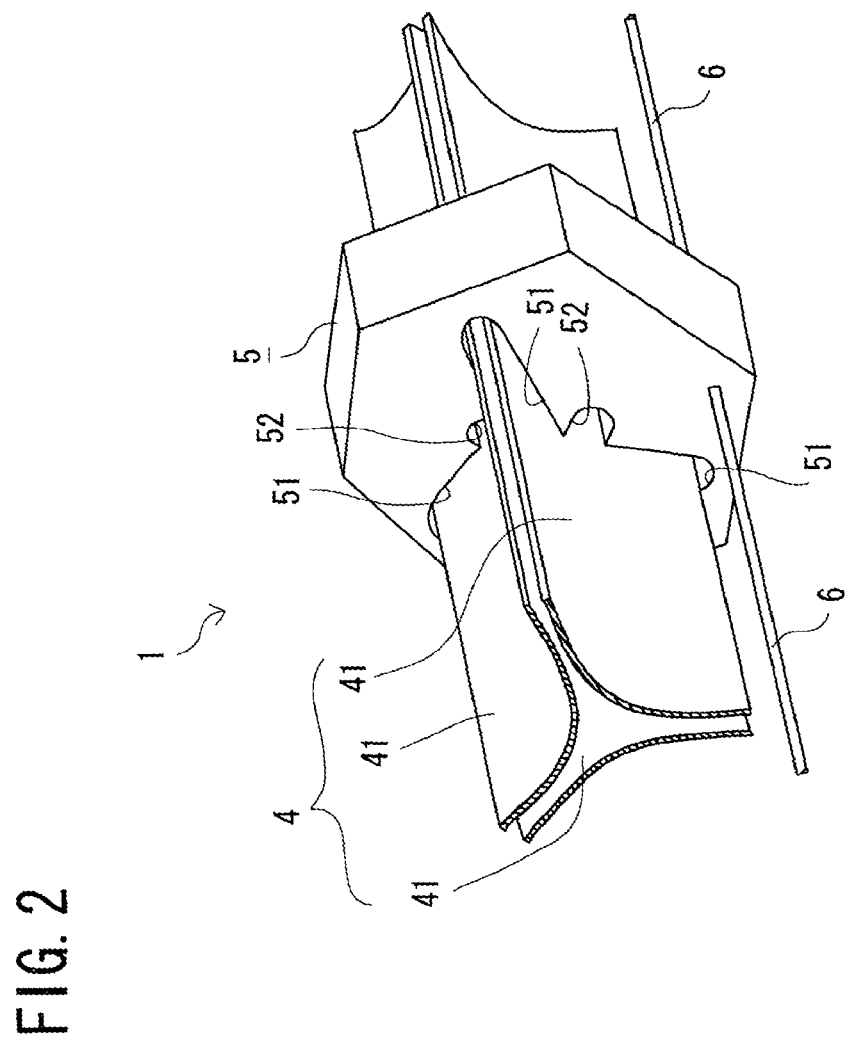

FIG. 17B
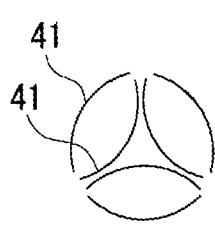 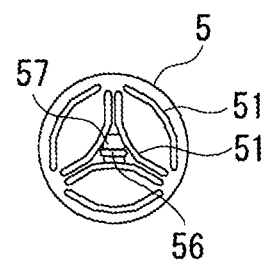

MANIPULATOR MECHANISM

CROSS-REFERENCE TO RELATED APPLICATIONS

This application is a divisional of U.S. patent application Ser. No. 12/438,458, filed Feb. 23, 2009, which is a National Stage entry of International Application No. PCT/JP2007/066233, filed Aug. 22, 2007, which claims priority to Japanese Application No. 2006-226099, filed Aug. 23, 2006, the entire contents of each of which is incorporated herein by reference.

FIELD OF THE INVENTION

The present invention relates to manipulator mechanisms used for robot arms and the like.

DESCRIPTION OF RELATED ART

This kind of manipulator mechanism is required to be extensible and have sufficient strength against the action of the external force, while being lightweight. Conventionally, various mechanisms have been proposed. For example, there has been proposed an actuator for light load in which one belt-shaped leaf spring is wound around a drum, and the leaf spring is paid out from the drum or wound around the drum so that the leaf spring is used as an extensible working arm (See Patent Document 1).

Also, there has been proposed an extensible antenna mast in which a plurality of tubes are extensibly coupled to each other in a vertical direction, and one metal tape passes through the tubes with the tip portion of the metal tape upwardly projecting from the tube at the end, while the base end of the metal tape is wound within a tape housing (See Patent Document 2).

Further, there has been proposed an extensible arm mechanism in which two cylindrical members with different outer diameters are coaxially disposed to form one arm. In this mechanism, each of the cylindrical members is formed by press forming of a metal band plate into cylindrical form having a central axis in a longitudinal direction thereof. The arm contracts when each of the cylindrical members is elastically deformed to expand from a cylinder to a band plate, while being wound in a roll shape. Or the arm extends when each of the members wound in a roll shape is elastically returns from a band plate to a cylinder, while being released from the roll shape (See Patent Document 3).

Patent Document 1: Japanese examined patent application No. H9-11178
Patent Document 2: U.S. Pat. No. 4,426,650
Patent Document 3: U.S. Pat. No. 3,975,581

DISCLOSURE OF THE INVENTION

Problems to be Solved by the Invention

However, the actuator for light load described above is problematic because the working arm is only comprised of one leaf spring, and therefore, when a great load acts on the working arm, the working arm bends. Thus, this actuator has a disadvantage of the limited use for light load.

The extensible antenna mast described above is also problematic because the metal tape passing through the plurality of tubes is only for extending and contracting the mast, and the strength of the mast is supported by the plurality of tubes, and therefore, when this antenna mast is used for a robot arm, these tubes prevent the weight saving.

Further, the above described extensible arm mechanism having two cylindrical members with different outer diameters coaxially disposed to form one arm is problematic because the cylindrical member has to be formed by using a band plate of great thickness to have sufficient strength, and therefore, the weight of the arm increases.

Thus, in the conventional manipulator mechanisms, it has been problematic because it is difficult to realize both sufficient strength and weight saving. Also, it has been problematic because when the arm bents due to the external force acted thereon, it is impossible to restore the arm due to plastic deformation on the bent portion of the arm.

An object of the present invention is to provide an extensible manipulator mechanism which realizes both having a sufficient strength and weight saving, and can be restored when the arm bends due to an excessive external force acted thereon.

Means for Solving the Problem

The manipulator mechanism according to the present invention comprises an arm 1 having a tip part and base end part, and an arm paying out device 2 to which the base end part of the arm 1 is coupled for winding and paying out the arm 1, the arm 1 comprising a tape aggregate 4 formed by bundling a plurality of elastic tapes 41, and a plurality of bundling members 5 slidably attached to the tape aggregate 4 with spaces therebetween in a longitudinal direction of the tape aggregate 4 to bundle the plurality of tapes 41. The plurality of elastic tapes 41 are made from a band plate made of metal having spring characteristics or synthetic resin, and therefore, have moderate elasticity and stiffness.

The plurality of elastic tapes 41 are formed by folding one continuous belt-shaped elastic material 46, and one end of the belt-shaped elastic material 46 is wound by the arm paying out device 2, while the other end of the belt-shaped elastic material 46 is fixed to the arm paying out device 2 at the constant position. Alternatively, the base end part of each of the plurality of elastic tapes 41 is wound by the arm paying out device 2 and separately paid out by the arm paying out device 2.

The plurality of tapes 41 slidably pass through the bundling members 5, and the bundling members 5 is provided with one guiding groove 51 to prevent the plurality of tapes 41 from being separated from each other, and the plurality of tapes 41 passing through the guiding groove 51 come into contact with each other at both ends in the longitudinal direction thereof. Alternatively, the plurality of tapes 41 slidably pass through the bundling members 5, and the bundling members 5 are provided with a plurality of guiding grooves 51 to prevent the plurality of tapes 41 from being separate from each other, and the plurality of tapes 41 passing through the guiding grooves 51 do not come into contact with each other.

In the manipulator mechanism according to the present invention described above, the arm 1 paid out from the arm paying out device 2 has the tape aggregate 4 formed by bundling a plurality of elastic tapes 41 as a main bone thereof, and the positional relation of the plurality of tapes 41 is fixed by the bundling members 5, whereby the tape aggregate 4 formed by bundling a plurality of elastic tapes 41 has high stiffness even if the stiffness of one of the tapes 41 is not sufficiently high.

Also, even if an excessive external force exceeding the stiffness of the tape aggregate 4 acts on the arm 1 paid out from the arm paying out device 2 to bend the arm 1, the arm 1 can be restored to the original linear shape because the positional relation of the plurality of tapes 41 forming the tape aggregate 4 is fixed by the bundling members 5 at several points so that the plurality of tapes 41 have sufficient stiffness.

In the case where the arm 1 is not restored to the original linear shape by its own elastic returning force, the restoration operation of the bent arm 1 is performed. For example, there are some effective operations such as the operation of hanging down the arm 1 perpendicularly downward, the operation of pushing the tip portion of the arm 1 to the ground or the like to forcefully restore the arm 1, or the operation of winding the arm 1 to contract the arm 1 and then extending the arm 1.

In a particular configuration, when paid out from the arm paying out device 2, the plurality of tapes 41 forming the tape aggregate 4 are arranged in a circle so that the cross-sectional shape of each of the tapes 41 is accommodated within the angular region of 180 degrees or less in circular polar coordinates with the origin at the center of the tape aggregate 4. For example, it is possible to adopt the configurations in which each of the tapes 41 is arranged within the angular region of 90, 120 or 180 degrees in circular polar coordinates, thereby realizing the tape aggregate 4 which is hard to bend in a certain direction.

Also, each of the plurality of tapes 41 forming the tape aggregate 4 is formed so as to have an arc-shaped cross-section perpendicular to the longitudinal direction. And the plurality of tapes 41 are bundled with a rear-to-rear positional relation with their convex curved rear surfaces opposed to each other, a ventral-to-ventral positional relation with their concave curved ventral surfaces opposed to each other, or a positional relation of combination of these positional relations. This enhances the stiffness of the tape aggregate 4, and makes the arm 1 elastically return more reliably when it is bent.

Here, according to the configuration in which the plurality of tapes 41 come into contact with each other at both ends thereof, the arm 1 has extremely high strength against bending. In contrast, according to the configuration in which the plurality of tapes 41 do not come into contact with each other, the arm 1 can be restored to the original shape with enough reversibility when it is bent due to an excessive load.

In a particular configuration, in a state where the arm 1 is extended, the plurality of bundling members 5 are coupled to each other by a coupling mechanism to define the spaces therebetween. The coupling mechanism contracts when the arm 1 contracts, to narrow the spaces between the plurality of bundling members 5.

Here, the spaces between the plurality of bundling members 5 in the arm 1 extended state are defined so as to gradually increase from the base end part toward the tip part of the arm 1. Therefore, the required minimum number of bundling members 5 can bundle the plurality of tapes 41 that form the tape aggregate 4, and give the tape aggregate 4 high stiffness over the entire length thereof.

In another particular configuration, the arm paying out device 2 comprises one or more reels 21 for winding the plurality of tapes 41 that form the tape aggregate 4, and it is possible to wind and pay out the arm 1 by rotating the reel 21. The plurality of reels 21 are arranged in the positional relation in which the rotation axes thereof intersect each other on the plane perpendicular to the longitudinal direction of the arm 1, or the positional relation in which the axes thereof are parallel to each other on the plane perpendicular to the longitudinal direction of the arm 1.

Among the plurality of bundling members 5, the bundling member 5a disposed the closest to the base end of the arm 1 is fixed to the arm paying out device 2 or attached to the arm paying out device 2 slidably within a certain range along the paying out direction of the arm 1. Thus, the plurality of tapes 41 paid out from the plurality of reels 21 have elastic deformation such as torsion from the posture at the exit of each reel 21 in the process of reaching the bundling member 5a disposed the closest to the base end of the arm 1. And then, the tapes 41 are fitted to the guiding groove 51 provided in the bundling member 5a. Then, the plurality of tapes 41 keep the relative positions constant in a predetermined posture within the region from the next bundling member 5 to a tip mechanism 3.

Here, according to the configuration in which the bundling member 5a is attached to the arm paying out device 2 slidably within a certain range, a transition deformation part 40 from the arm paying out device 2 to the bundling member 5a in the arm 1 contracted state is shortened to enable compact accommodation. Also, in a paying out operation of the arm 1, it is possible to smoothly pay out the arm 1 by extending the transition deformation part 40.

As a method of attaching the bundling member 5a to the arm paying out device 2 slidably within a certain range, it is possible to adopt the structure in which the bundling member 5a is accommodated in a case of the arm paying out device 2, and the case guides the slide of the bundling member 5a, thereby realizing an easy structure.

Effect of the Invention

According to the manipulator mechanism of the present invention, even if the plurality of tapes 41 that form the tape aggregate 4 are formed from the thin band plates to attempt the weight saving, the tape aggregate 4 has sufficient stiffness. Also, even if an excessive external force temporarily acts on the arm 1 to bend the arm 1, the restoration is possible. Therefore, the weight saving of the tapes 41 can be attempted to the maximum. In addition, the number of bundling members 5 does not require more than the required minimum number, and therefore, the bundling members 5 do not prevent the weight saving.

Therefore, with the manipulator mechanism of the present invention, it is possible to realize both sufficient strength and weight saving. In addition, the manipulator mechanism of the present invention is suitable for an extensible robot arm because it is possible to restore the arm 1 when it is bent due to an excessive external force acted thereon.

BRIEF DESCRIPTION OF THE DRAWINGS

FIGS. 1A and 1B are side views of a manipulator mechanism according to the present invention showing extending state and contracted state thereof;

FIG. 2 is an enlarged perspective view of a tape aggregate and bundling member;

FIG. 17B contains front views showing other configurations of the tape arrangement and the bundling member;

EXPLANATION OF LETTERS OR NUMERALS

Figure 3:
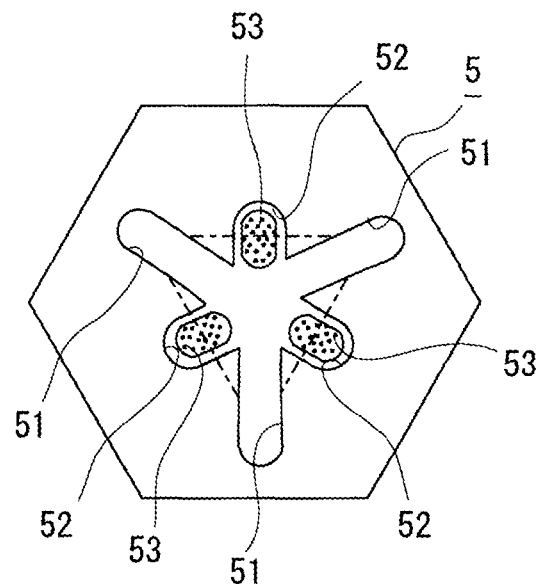
FIG. 3 is a front view of the bundling member.
Figure 4:
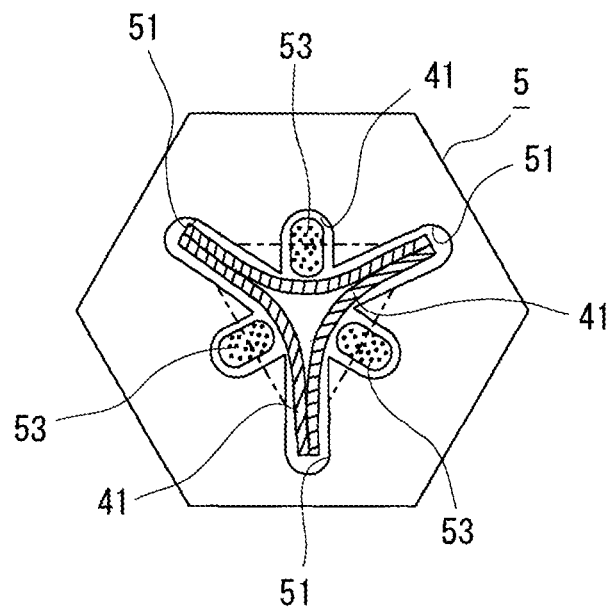
FIG. 4 is a front view of the bundling member with the tape aggregate passing therethrough.

1. Arm
2. Arm paying out device
21. Reel
22. Reel driving mechanism
23. Motor
3. Tip mechanism
4. Tape aggregate
40. Transition deformation part
41. Tape
5. Bundling member
51. Guiding groove
53. Roller
6. Coupling rope

BEST MODE FOR CARRYING OUT THE INVENTION

A preferred embodiment is specifically discussed below with reference to the drawings.

As shown in FIGS. 1A and 1B, the manipulator mechanism according to the present invention comprises an arm 1 having a tip mechanism 3 at the tip part thereof, and an arm paying out device 2 to which the base end part of the arm 1 is coupled, for winding and paying out the arm 1.

As shown in FIG. 2, the arm 1 comprises a tape aggregate 4 formed by bundling three tapes 41, 41, 41 made of spring steel plates, and a plurality of bundling members 5 slidably attached to the tape aggregate 4 with spaces therebetween in a longitudinal direction of the tape aggregate 4. Each of the three tapes 41, 41, 41 forming the tape aggregate 4 has an arc-shaped cross-section perpendicular to the longitudinal direction thereof. These three tapes 41, 41, 41 are arranged in a circle so that the cross-sectional shape of each of the tapes 41 is accommodated within the angular region of 120 degrees in circular polar coordinates with the origin at the center of the tape aggregate 4. Also, the tapes 41, 41, 41 have a rear-to-rear positional relation with their convex curved rear surfaces opposed to each other.

The arm 1 contracts as shown in FIG. 1B when the three tapes 41, 41, 41 forming the tape aggregate 4 are wound in a roll shape by the arm paying out device 2, and extends as shown in FIG. 1A when the three tapes 41, 41, 41 are paid out at the same time from the arm paying out device 2. Since the arm 1 has sufficient stiffness due to the structure such that the tape aggregate 4 is formed by bundling the three tapes 41, 41, 41, the arm 1 does not easily bend due to the external force acting on the tip mechanism 3 in the extended state shown in FIG. 1A.

As shown in FIG. 2, the bundling member 5 is provided with three guiding grooves 51, 51, 51 radially from the center of the bundling member 5 and with 120 degrees angular differences. The tape aggregate 4 penetrates three guiding grooves 51, 51, 51, which keep the postures and relative positions of the three tapes 41, 41, 41 constant.

As shown in FIG. 3, three recesses 52, 52, 52 are radially defined on the bundling member 5, opposed to the central opening of the bundling member 5 with phase differences of 60 degrees with the three guiding grooves 51, 51, 51. And a roller 53 is provided in each of the three recesses 52, 52, 52. These rollers 53, 53, 53 come into contact with the central parts of the ventral surfaces of the three tapes 41, 41, 41 respectively to make these tapes 41, 41, 41 smoothly move relative to the bundling member 5.

As shown in FIG. 1A, the plurality of bundling members 5 are coupled to each other by a rope-like coupling cord 6 having a circular cross-section. In the arm 1 extended state, the coupling cord 6 is in a state of tension, and defines the distances between the plurality of bundling members 5. Here, the distance between the adjacent bundling members 5 is defined so as to gradually increase from the base end part to tip part of the arm 1. In the arm 1 contracted state as shown in FIG. 1B, the coupling cord 6 is loosened and the plurality of bundling members 5 come into contact with each other.

Here, among the plurality of bundling members 5, the bundling member 5a disposed the closest to the base end of the arm 1 is fixed to the casing of the arm paying out device 2. In contrast, the remaining bundling members 5 slidably engage the tape aggregate 4.

With the arm 1 described above, even if the tape aggregate 4 is bent due to the excessive external force acted thereon, and the circular arrangement of the three tapes 41, 41, 41 is broken at the bent point, the three tapes 41, 41, 41 keep the circular arrangement described above at the plurality of points where the bundling members 5 are attached, so that the three tapes 41, 41, 41 elastically return to restore the arm 1 to the original linear shape as soon as the external force is eliminated.

Particularly, the three tapes 41, 41, 41 forming the tape aggregate 4 are arranged in a circle with their rear surfaces opposed to each other, and therefore, deformation amount at the bent point is small compared to the structure such that the three tapes 41, 41, 41 are arranged in a circle with their ventral surfaces opposed to each other. Therefore, the tape 41 does not have plastic deformation.

The arm paying out device 2 comprises a reel driving mechanism 22, and has one or a plurality of reels 21 for winding the three tapes 41, 41, 41 that form the tape aggregate 4. And the reel 21 is driven to rotate forward and backward by a motor 23 to extend and contract the arm 1. Here, each tape 41 is wound in a roll shape by the reel 21, or paid out by the reel 21.

Figure 5A:
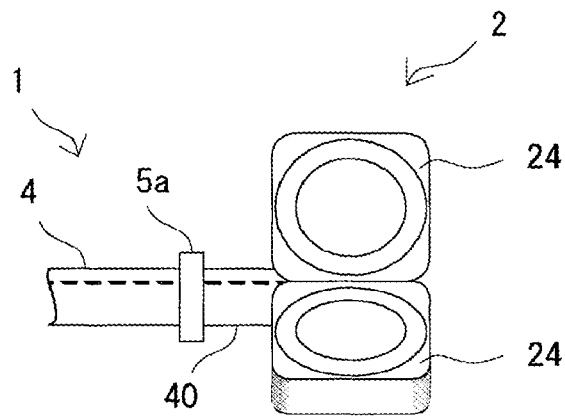
FIGS. 5A, 5B and 5C are a side view and two front views of an arm paying out device showing the structure thereof.
Figure 5B:
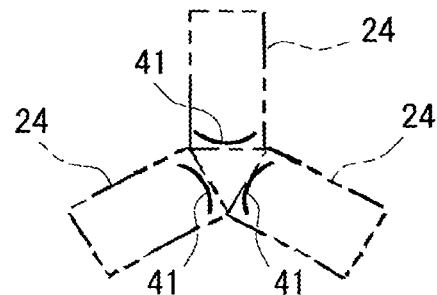
Figure 5C:
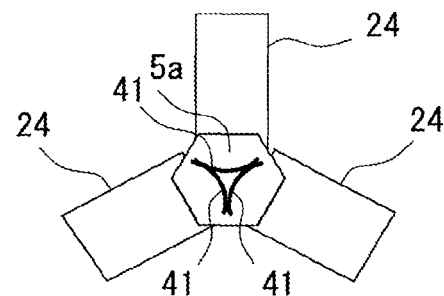

For example, the arm paying out device 2 as shown in FIGS. 5A, 5B and 5C comprises three reel cases 24, 24, 24 each including a reel therein. These reel cases 24, 24, 24 are arranged in a positional relation in which the rotation axes of the reels intersect each other with phase differences of 120 degrees on the plane perpendicular to the longitudinal direction of the arm 1. Here, the rotation of the reels of the three reel cases 24, 24, 24 is synchronized by an interlocking mechanism using a worm gear (not shown).

The three tapes 41, 41, 41 paid out from the three reel cases 24, 24, 24 as shown in FIG. 5B are arranged in a circle so that the cross-sectional shape of each of the tapes 41 is accommodated within the angular region of 120 degrees in circular polar coordinates, while greatly separated from each other. However, as shown in FIG. 5C, the three tapes 41, 41, 41 which passed through the first bundling member 5a are arranged in a circle so that the cross-sectional shape of each of the tapes 41 is accommodated within the angular region of 120 degrees in circular polar coordinates, while coming into contact with each other on the rear surfaces thereof. In this case, the tape aggregate 4 paid out from the arm paying out device 2 has a transition deformation part 40 before reaching the first bundling member 5a. The three tapes 41, 41, 41 twist and approach each other in the transition deformation part 40.

Figure 6A:
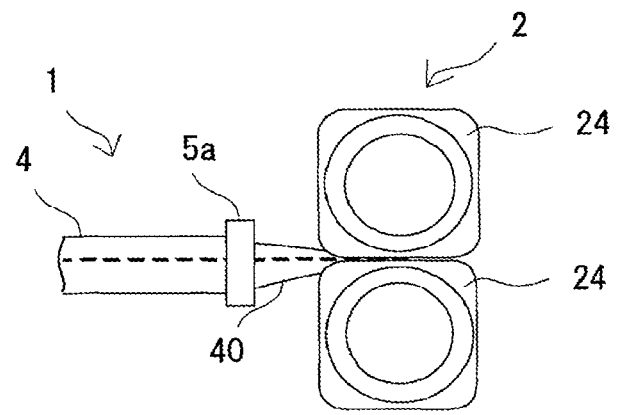
FIGS. 6A, 6B and 6C are a side view and two front views of another arm paying out device showing the structure thereof.
Figure 6B:
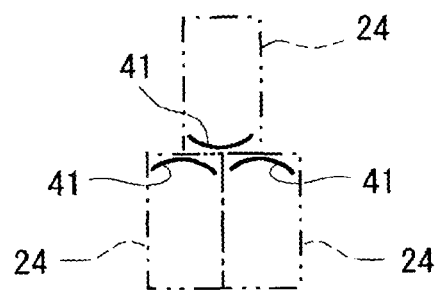
Figure 6C:
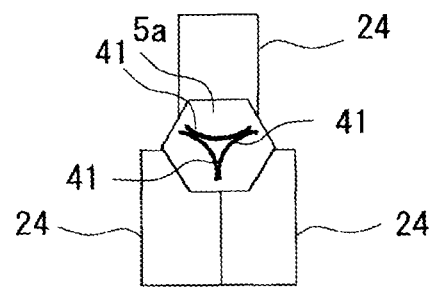

Also, the arm paying out device 2 shown in FIGS. 6A, 6B AND 6C comprises three reel cases 24, 24, 24 each including a reel therein. These reel cases 24, 24, 24 are arranged in a positional relation in which the axes of the reels are parallel to each other on the plane perpendicular to the longitudinal direction. Similarly, the rotation of the reels of the three reel cases 24, 24, 24 is synchronized by an interlocking mechanism using a gear (not shown).

The three tapes 41, 41, 41 paid out from the three reel cases 24, 24, 24 as shown in FIG. 6B are separated from each other and in a relative position parallel with each other, and do not have the circular arrangement. However, as shown in FIG. 6C, the three tapes 41, 41, 41 which passed through the first bundling member 5a are arranged in a circle so that the cross-sectional shape of each of the tapes 41 is accommodated within the angular region of 120 degrees in circular polar coordinates, while coming into contact with each other. In this case, the tape aggregate 4 paid out from the arm paying out device 2 has a transition deformation part 40 before reaching the first bundling member 5a. The three tapes 41, 41, 41 twist and approach each other in the transition deformation part 40.

Figure 7A:
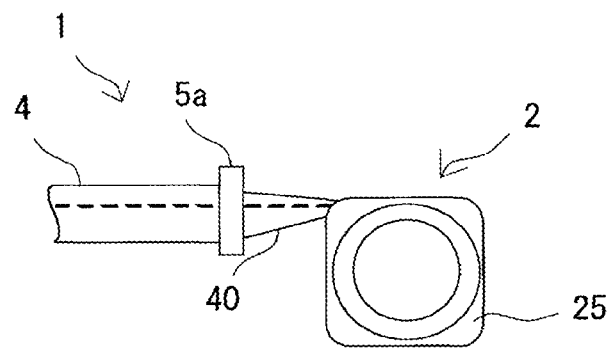
FIGS. 7A, 7B and 7C are a side view and two front views of another arm paying out device showing the structure thereof.
Figure 7B:
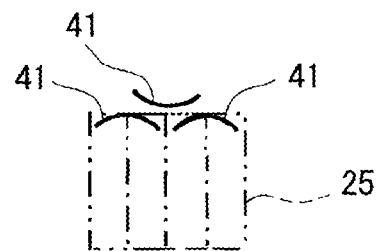
Figure 7C:
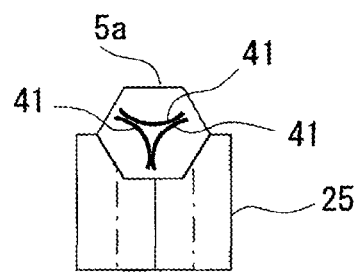

The arm paying out device 2 shown in FIGS. 7A, 7B and 7C comprises one reel case 25, and the three tapes are wound around the reel in the reel case 25 in a rear-to-rear relative position as shown in FIG. 7B. According to this arm paying out device 2, it is not required to provide the interlocking mechanism, thereby realizing the compactification.

The three tapes 41, 41, 41 paid out from the reel case 25 as shown in FIG. 7B are separated from each other in a relative position parallel with each other, and do not have the circular arrangement. However, as shown in FIG. 7C, the three tapes 41, 41, 41 which passed through the first bundling member 5a are arranged in a circle so that the cross-sectional shape of each of the tapes 41 is accommodated within the angular region of 120 degrees in circular polar coordinates, while coming into contact with each other. In this case, the tape aggregate 4 paid out from the arm paying out device 2 has a transition deformation part 40 before reaching the first bundling member 5a. The three tapes 41, 41, 41 twist and approach each other in the transition deformation part 40.

Figure 8A:
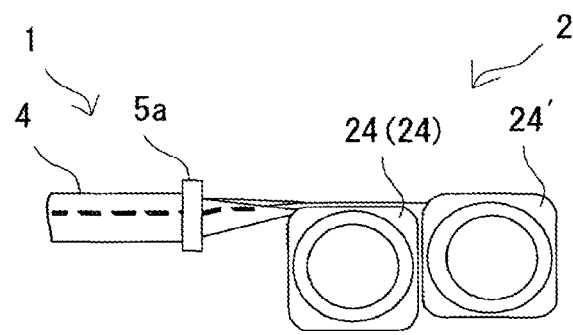
FIGS. 8A and 8B are side views each showing the structure of still another arm paying out device thereof.
Figure 8B:
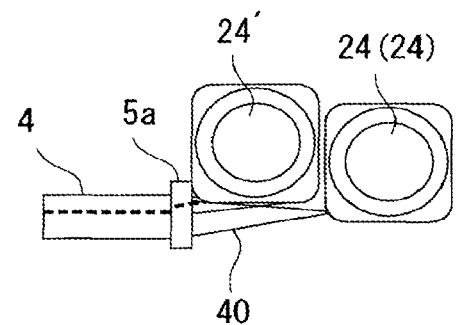

Further, in the arm paying out device 2 shown in FIG. 8A or 8B, the three reel cases 24, 24, 24 are arranged in the standing posture and have the positional relation in which the rotation axes of the reels of the reel cases 24, 24, 24 are perpendicular to the longitudinal direction of the arm 1 and are parallel to each other. The reels of these reel cases 24, 24, 24 rotate simultaneously due to an interlocking gear (not shown). Also in this arm paying out device 2, the tape aggregate 4 paid out from the arm paying out device 2 has a transition deformation part 40 before reaching the first bundling member 5a. The three tapes 41, 41, 41 twist and approach each other in the transition deformation part 40. Here, in the arm paying out device 2 shown in FIG. 8A, the reel cases 24, 24 which pay out two tapes 41, 41 to be twisted in the transition deformation part 40 are arranged in front of the reel case 24' which pays out one tape 41 not to be twisted in the transition deformation part 40. In contrast, in the arm paying out device 2 shown in FIG. B, the reel cases 24, 24 which pay out two tapes 41, 41 to be twisted in the transition deformation part 40 are arranged posterior to the reel case 24' which pays out one tape 41 not to be twisted in the transition deformation part 40.

Figure 9:
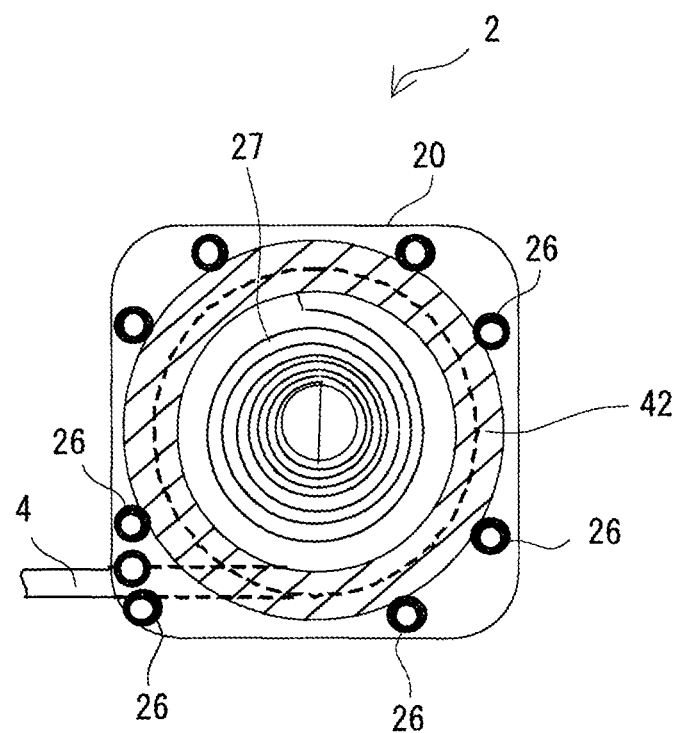
FIG. 9 is a side view of the arm paying out device showing an inner structure thereof.

On the other hand, the arm paying out device 2 shown in FIG. 9 adopts the structure such that a reel case 20 is provided with a plurality of rollers 26 therein to guide the rotation of the reel body 42, as well as a spiral spring 27 to rotatingly bias the reel body 42 in the tape paying out direction to bias the paying out of the tape aggregate 4 while preventing the backward rotation at the time of rewind of the spiral spring 27 by means of a ratchet mechanism or the like. This structure realizes the quick extension operation of the arm 1.

Figure 10A:
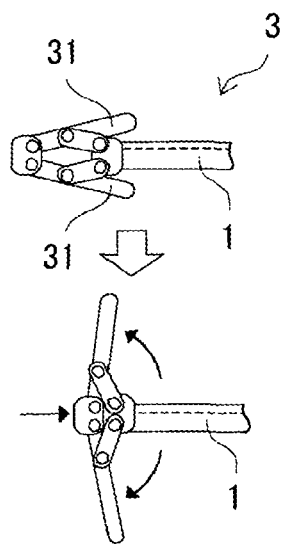
FIGS. 10A to 10D are side views of a tip mechanism showing several configurations thereof.
Figure 10B:
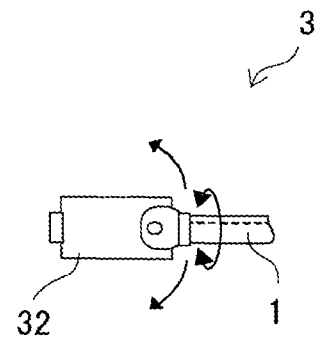
Figure 10C:
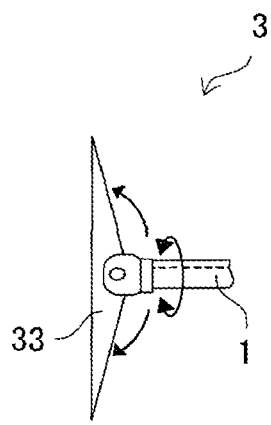
Figure 10D:
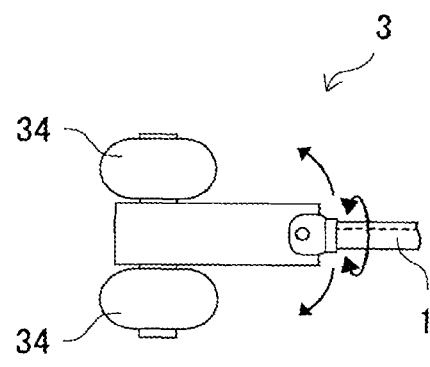

The tip mechanism 3 attached to the tip part of the arm 1 has a function for performing a particular work or operation. For example, it is possible to adopt various structures such as having a pair of projections 31, 31 capable of opening and closing operation as shown in FIG. 10A, having a camera 32 as shown in FIG. 10B, having a supporting member 33 for landing as shown in FIG. 10C, and having a wheel 34 for travelling as shown in FIG. 10D.

Figure 11:
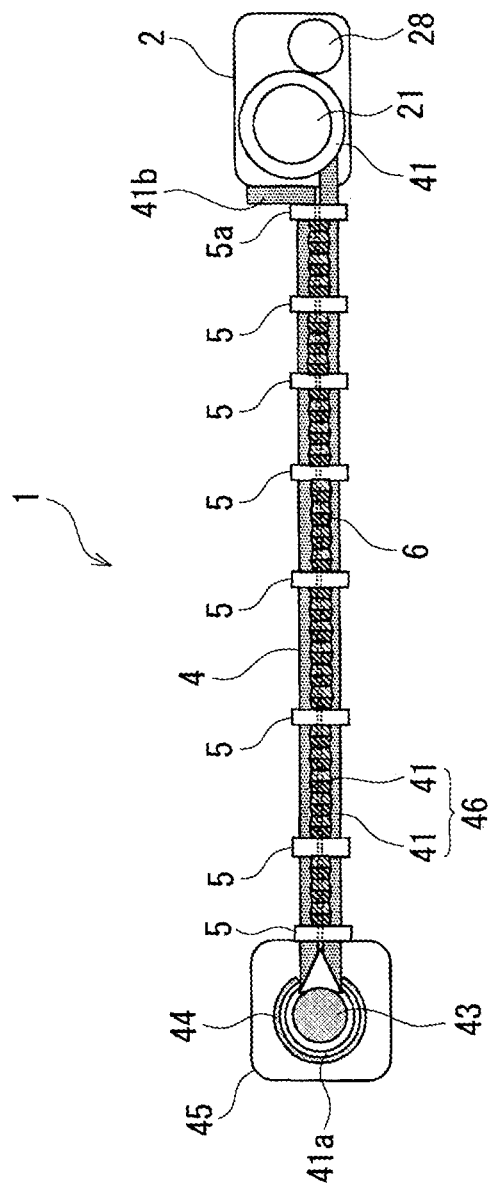
FIG. 11 is a side view showing another configuration of the manipulator mechanism according to the present invention.

FIG. 11 shows another configuration of the manipulator mechanism of the present invention. In this configuration, the two tapes 41, 41 are formed by folding one belt-shaped elastic material 46 having an arc-shaped cross-section into two. One end 41b of the belt-shaped elastic material 46 is fixed to the arm paying out device 2, while the other end of the belt-shaped elastic material 46 is wound around the reel 21 of the arm paying out device 2.

The plurality of bundling members 5 are attached to the tape aggregate 4 formed in the way described above, and are coupled to each other by two coupling cords 6 to form the extensible arm 1.

The arm 1 is provided with a tip case part 45 at the tip part thereof, and in the tip case part 45, a roller 43 is pivotally supported and the guiding wall 44 is formed oppositely to the outer peripheral surface of the roller 43. The folded part 41a of the belt-shaped elastic material 46 is wound around the roller 43, and is guided by the guiding wall 44 to be capable of smooth direction change by 180 degrees.

The arm paying out device 2 is provided with a tape driving roller 28 being in contact with the outer peripheral surface of the tape 41 wound around the reel 21 for paying out and winding the tape 41. When paid out from the reel 21 by the rotation of the tape driving roller 28, the tape 41 changes its direction by 180 degrees in the tip case part 45, and then moves to the side of the other tape 41, whereby the arm 1 extends.

Figure 12:
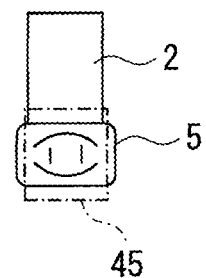
FIG. 12 is a front view of the manipulator mechanism.
Figure 13:
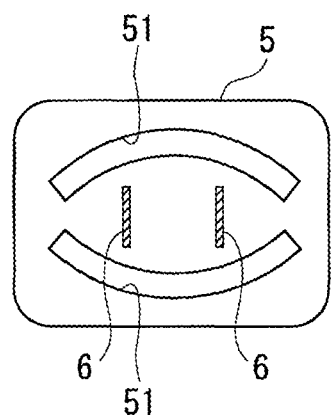
FIG. 13 is a front view of the bundling member.
Figure 14:
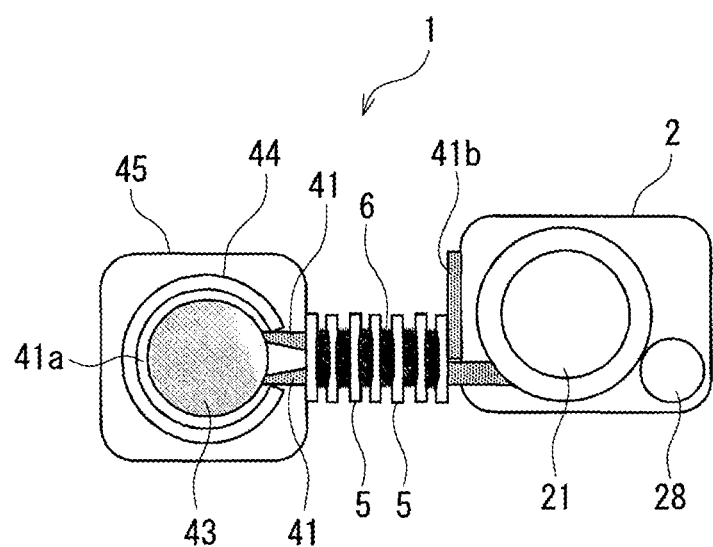
FIG. 14 is a side view of the manipulator mechanism showing the contracted state.
Figure 15:
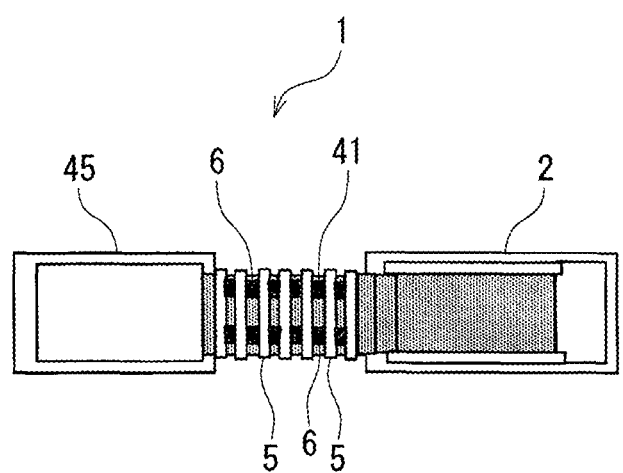
FIG. 15 is a plane view of the manipulator mechanism showing the contracted state.
Figure 16:
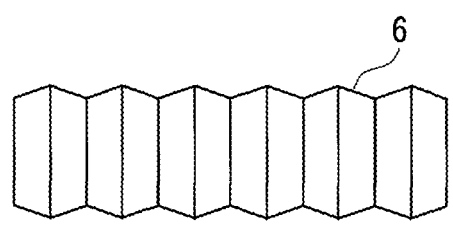
FIG. 16 is a side view of a coupling code being folded.

As shown in FIGS. 12 and 13, the bundling member 5 is provided with two arc-shaped guiding grooves 51, 51 to be passed through by the two tapes 41, 41. Also, the two coupling cords 6, 6 pass through the bundling member 5 between the two guiding grooves 51, 51, and are fixed to the bundling member 5. The coupling cord 6 has a belt-like shape. In a state where the arm 1 is contracted as shown in FIGS. 14 and 15, the coupling cord 6 is folded in a folding screen shape along the preformed folding lines as shown in FIG. 16. Therefore, the coupling cord 6 does not protrude from the two tapes 41, 41, and the two tapes 41, 41 do not become entwined with each other.

The mass productivity of the tape aggregate 4 can be improved by forming the tape aggregate 4 from one belt-shaped elastic material 46 as mentioned above.

Figure 17A:
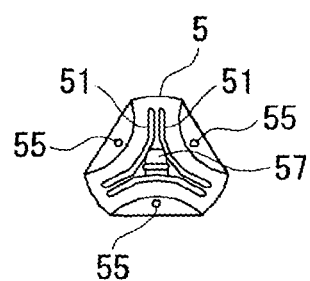
FIGS. 17AA to 17AF are front views of the bundling member showing various configurations thereof.
Figure 17A:
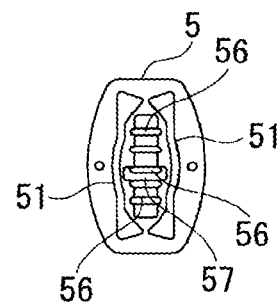
Figure 17A:
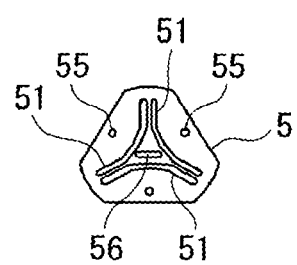
Figure 17A:
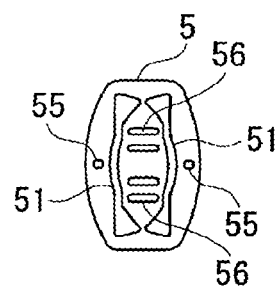
Figure 17A:
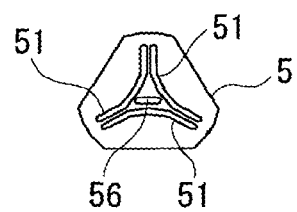
Figure 17A:
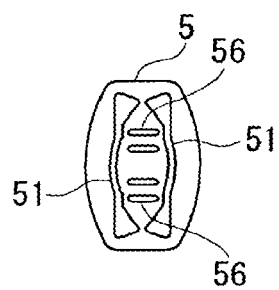

FIGS. 17AA-17AF show various configurations of the bundling member 5. In the bundling members 5 shown in FIGS. 17AA, 17AB and 17AC, three arc-shaped guiding grooves 51, 51, 51 are provided with their rear surfaces opposed to each other, and one tape 41 pass through each guiding groove 51. According to these bundling members 5, it is possible to keep the arc-shaped three tapes 41 in the rear-to-rear positional relation.

In contrast, in the bundling members 5 shown in FIGS. 17AD, 17AE and 17AF, the two arc-shaped guiding grooves 51, 51 are provided facing each other, and one tape 41 pass through each guiding groove 51. According to these bundling members 5, it is possible to keep the arc-shaped two tapes 41 in the ventral-to-ventral positional relation.

Also, in the bundling members 5 shown in FIGS. 17AA, 17AB, 17AD and 17AE, a plurality of circular holes 55 are provided outside the plurality of guiding grooves 51, while one or a plurality of slit holes 56 are provided inside the plurality of guiding grooves 51. Here, on one side of the bundling member 5 shown in FIGS. 17A and 17AD, a recess 57 is defined in the area where a slit hole 56 is provided, and the accommodation space of the coupling cord 6 at the time of the arm contraction is defined by the recess 57. On the other hand, in the bundling members 5 shown in FIGS. 17AC and 17AF, the one or plurality of slit holes 56 are provided only inside the plurality of guiding grooves 51. The fixation of the coupling cord 6 is conducted using part or all of these circular holes 55 or slit hole 56.

According to the bundling members 5 shown in FIGS. 17AA-17AF, in the state where the arm 1 extends, the plurality of tapes 41 are separately held by the guiding groove 51 of the bundling member 5. Therefore, the shape accuracy and strength of each tape 41 in the extended state can be increased. In addition, since the plurality of tapes 41 are maintained to be separated from each other in the arm 1 extended state, interference between the tapes 41 when the arm 1 is bent due to overload is inhibited, and therefore, the arm 1 bends safely. Further, a hole can be provided inside the plurality of guiding grooves 51 so that the coupling cord 6 can pass through the hole, and therefore, the coupling cord 6 can be held inside the arm 1 even when the arm 1 contracts.

In the bundling members 5 shown in FIGS. 17AD, 17AE and 17AF, the width of the guiding groove 51 increases toward its both ends, thereby allowing the deformation of the tape 41 from the arc-shaped cross-section to linear cross-section when the arm 1 bends. In addition, it is possible to adopt the structure such that the deformation of the tape 41 when the arm 1 bends is allowed by the elastic deformation of the bundling member 5 itself.

FIG. 17B shows another configuration of six tapes 41 to 42 and a bundling board 5. The six tapes 41 to 42 comprise three tapes 41, 41, 41 in the central part with their convex curved rear surfaces opposed to each other, and three tapes 41, 41, 41 in the outer peripheral part with their concave curved ventral surfaces opposed to the three tapes 41, 41, 41 in the central part. The bundling board 5 is provided with six guiding grooves 51 through which the six tapes 41 to 42 pass, and one slit hole 56 through which the coupling cord 6 pass.

Figure 18:
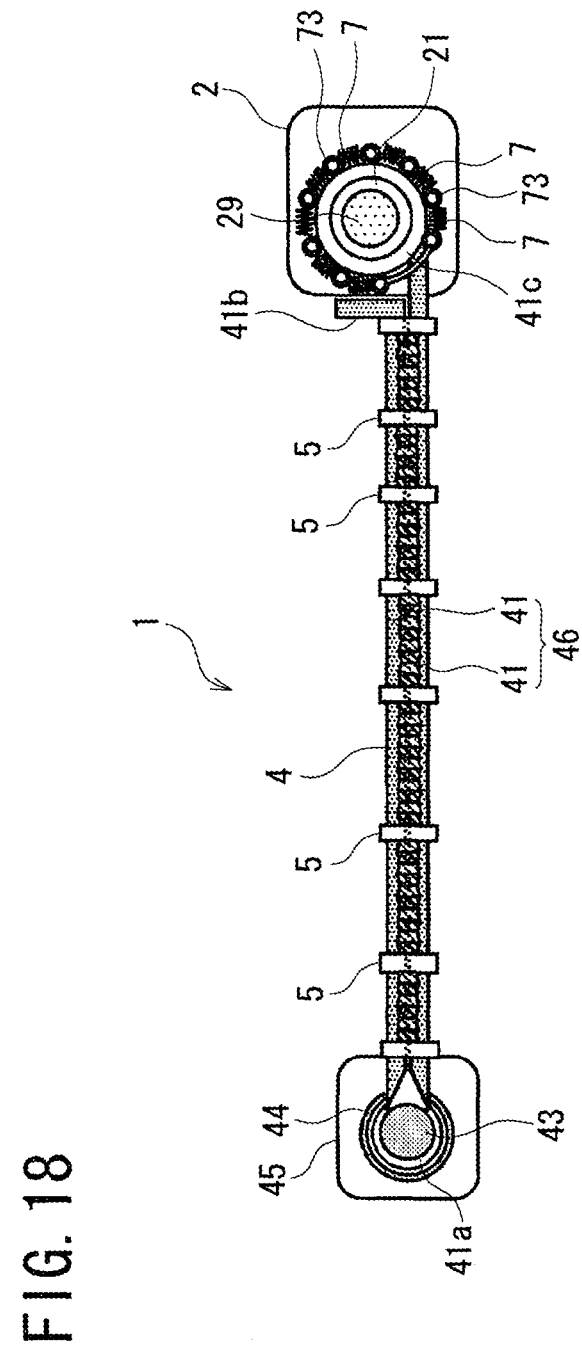
FIG. 18 is a side view of the arm paying out device showing another configuration thereof.

In the manipulator mechanism shown in FIG. 18, the arm paying out device 2 is provided with a tape extending and contracting drive motor 29 for forward and backward rotary driving of the reel 21 with the base end part 41c of the tape 41 wound therearound, as well as a pressing mechanism surrounding the outer peripheral surface of the tape 41c and having a coil spring 7 and the roller 73 coupled alternately. And the roller 73 is pushed to the outer peripheral surface of the tape 41c by the elasticity retraction of the coil spring 7. This prevents the swelling of the tape 41 in the process of paying out the tape 41 by the tape extending and contracting drive roller 29, and the tape 41 is paid out smoothly.

Here, when an external load acts on the tip part of the arm 1, the load acts on the tape 41c wound around the reel 21 as a reaction force, and the tight wind state of the tape 41c loosens, and therefore, the pressing force of the roller 73 should be set to the strength that can endure the expected external load. However, it is also possible to adjust the pressing force of the roller 73 to make the wind state of the tape 41c slightly loosen when the external load acts on the tip part of the arm 1, so that the tape 41c swell between the adjacent rollers 73, 73, and a braking force against the backward rotation of the reel 21 can be thereby generated.

Figure 19:
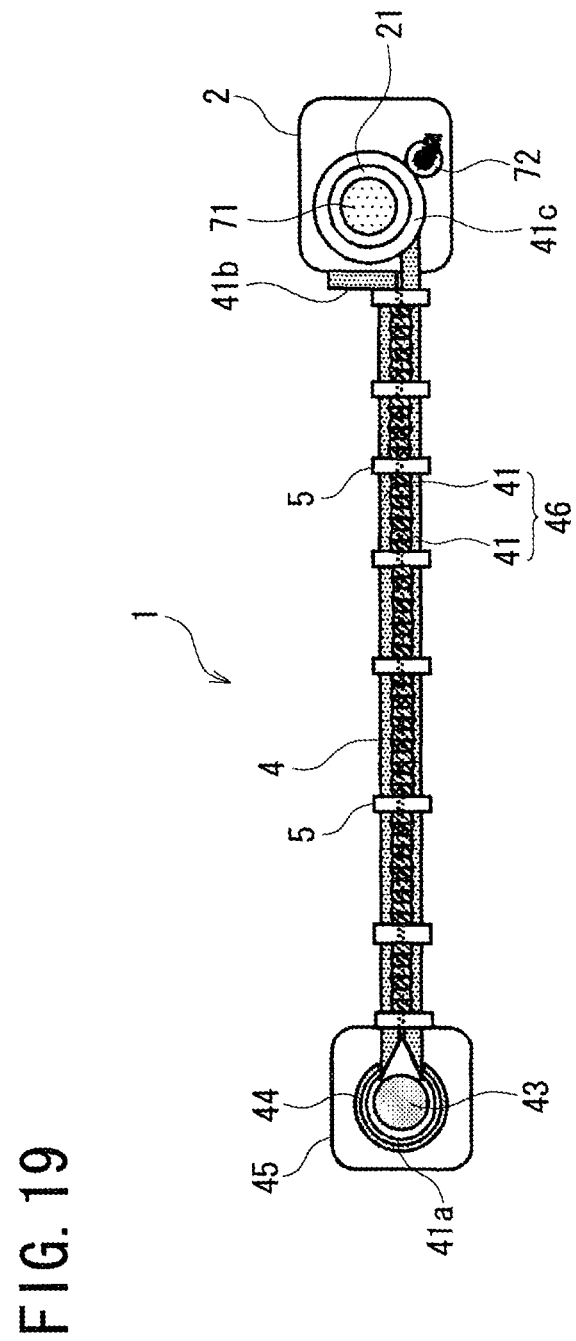
FIG. 19 is a side view of the arm paying out device showing still another configuration thereof.

In the manipulator mechanism shown in FIG. 19, the arm paying out device 2 is provided with a tape winding drive motor 71 for driving the reel 21 with the base end part 41c of the tape 41 wound therearound, as well as a tape paying out drive roller 72 being in contact with the outer peripheral surface of the tape 41c to pay out the tape 41c. Therefore, it is possible to individually set the driving force at the time of winding the tape by the tape winding drive motor 71 and the driving force at the time of paying out the tape by the tape paying out drive roller 72 to constitute a driving system suitable for the tape winding operation and tape paying out operation, and thereby allowing the winding and paying out of the tape 41 without loosening the tape 41. It is appreciated that as well as the structure such that the tape winding drive motor 71 and the tape paying out drive roller 72 are limited to tape winding and paying out respectively, it is also possible to adopt the structure such that the tape winding drive motor 71 and the tape paying out drive roller 72 provide the tape with the driving force in the same direction with consideration of difference between the linear velocity and angular velocity. It is also appreciated that the drive motor 71 and drive roller 72 can be interlocked with each other.

Figure 20:
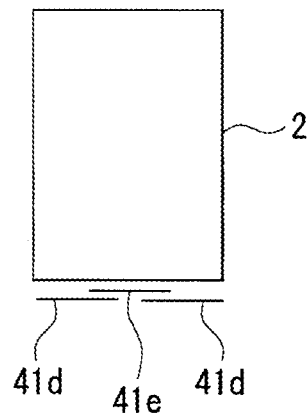
FIG. 20 is a front view of three tapes showing the arrangement thereof.
Figure 21:
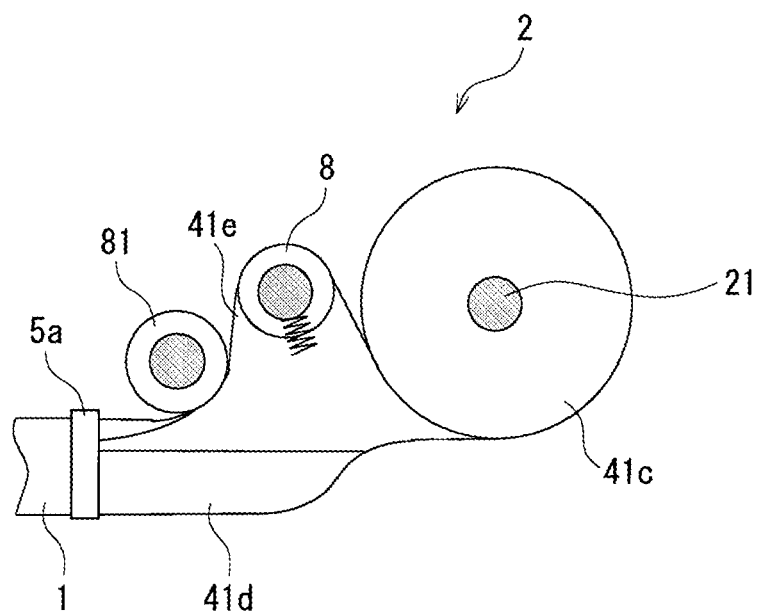
FIG. 21 is a side view of a tension providing mechanism showing a configuration thereof.

In the manipulator mechanism in which three tapes 41d, 41d, 41e are paid out in the postures parallel to each other from the arm paying out device 2 as shown in FIG. 20, when the arm 1 contracts, one tape 41e disposed the closest to the reel center of the arm paying out device 2 has lower winding speed than the other two tapes 41d, 41d do, and therefore, the one tape 41e loosens. Therefore, as shown in FIG. 21, the arm paying out device 2 is provided with a guiding roller 81 and a tension providing roller 8 along the movement path of the one tape 41e extending between the bundling member 5a disposed the closest to the base end part of the arm 1 and the reel 21. Here, the tension providing roller 8 is biased by a spring toward the tape 41e to provide the tape 41e with a tension above a certain level, thereby absorbing the loose.

It is appreciated that the tension providing mechanism can be provided not only on the arm paying out device 2, but also on the tip part of the arm 1. In addition, the tension providing mechanism is not limited to the structure of biasing the tension providing roller 8 by a spring, but it is also possible to move the tension providing roller using a cam mechanism interlocked with the rotation of the reel or an arithmetic device.

Figure 22A:
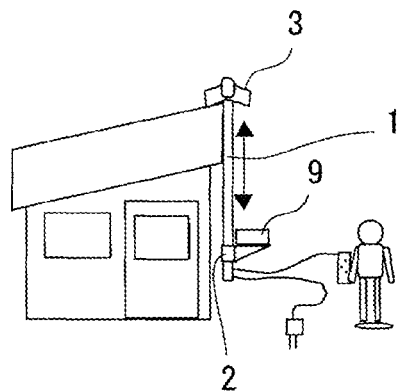
FIGS. 22A, 22B and 22C are drawings showing applications of the manipulator mechanism according to the present invention.
Figure 22B:
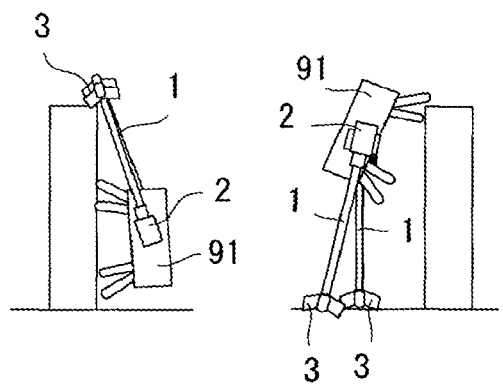
Figure 22C:
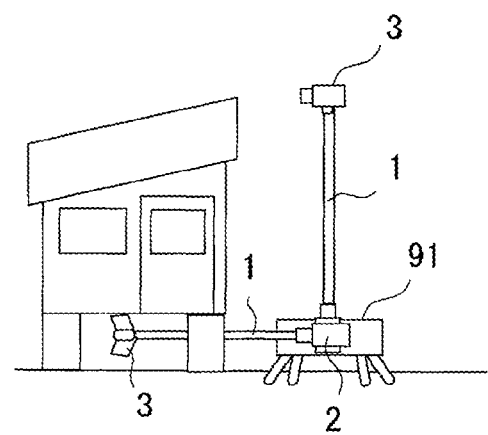

According to the above described manipulator mechanism, it is possible to utilize the extension and contraction of the arm 1 for going up and down work of a machine 9 as shown in FIG. 22A, utilize the extension and contraction of the arm 1 for going up and down movement of a vehicle 91 as shown in FIG. 22B, or perform work in a narrow place or high place by extending and contracting the arm 1 equipped on the vehicle 91 as shown in FIG. 22C. Here, the extension and contraction of the arm 1 can be performed by remote control.

Figure 23A:
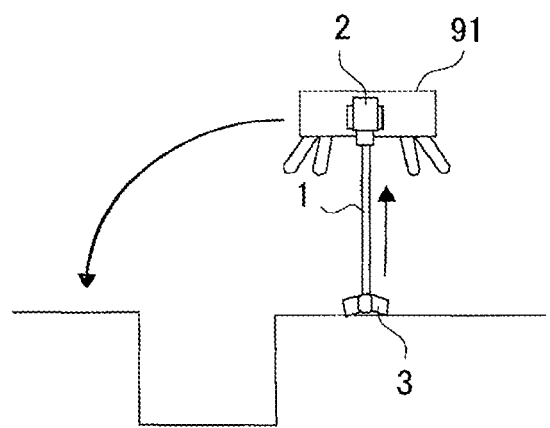
FIGS. 23A and 23B are drawings showing other applications of the manipulator mechanism according to the present invention.
Figure 23B:
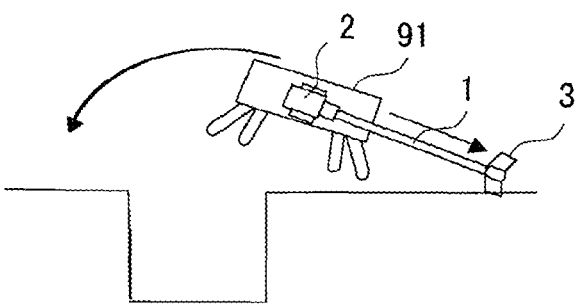

In addition, it is possible to realize the groove passing over movement of the vehicle 91 utilizing the extension and contraction of the arm 1 as shown in FIG. 23A, or the jump movement of the vehicle 91 utilizing the rapid extension movement of the arm 1 using the above-mentioned spiral spring or the like as shown in FIG. 23B.

Figure 24A:
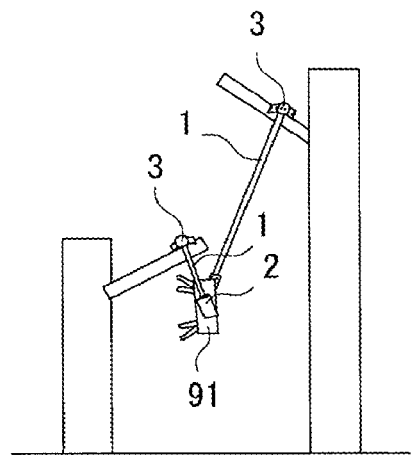
FIGS. 24A and 24B are drawings showing still other applications of the manipulator mechanism according to the present invention.
Figure 24B:
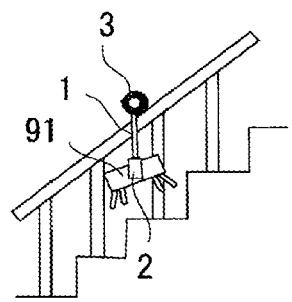

Further, it is also possible to realize the transfer between the high places of the vehicle 91 using a plurality of manipulator mechanisms as shown in FIG. 24A, or realize the climbing up and down the stair of the vehicle 91 using the tip mechanism 3 equipped with a wheel as shown in FIG. 24B. Still further, it is also possible to realize the movement such as transfer by combining three or more arms 1.

According to the manipulator mechanism of the present invention, with the structure of having the arm 1 as main bone thereof, it is possible to provide the arm 1 with sufficient strength against the external force which acts thereon along with various works. In addition, with the structure of bundling the tape aggregate 4 by means of the plurality of bundling members 5, it is possible to elastically deform the tape aggregate 4 in a restorable way when the excessive external force acts thereon, so that the damage of the arm 1 is prevented and the weight saving of the arm 1 is attempted.

Also, according to the manipulator mechanism of the present invention, since various works and movements can be realized by utilizing the extension and contraction of the arm 1, the effective utilization is possible in reduction of the dangerous work or hard work in a disaster area or high place. For example, in rescue operations in the river or the like, the long extended arm 1 can be utilized as a substitute for a rescue rope. An example of the work in the high place can include set and release of the safety belt (a lifeline), but it is also effective for the work in the low-rise building. Further, it is also effective for the work in the narrow place such as the place under floor. At the time of the working, since the arm 1 can be contracted to be compactified, it does not lie in the way of the work. In addition, with the quick extension and contraction of the arm 1, it can be used for capture of an animal or threat means for an animal.

The present invention is not limited to the foregoing embodiment in construction but can be modified variously within the technical scope set forth in the appended claims. For example, the tape aggregate 4 is not limited to the structure of comprising three tapes 41, 41, 41, but it is also possible to adopt various structures such as combining six tapes 41 to 41 in the shape of a honeycomb. The tape 41 can be formed from a synthetic resin board with moderate spring characteristics and stiffness, or the composite material of metal and synthetic resin, as well as a spring steel sheet. For each angular region in the circular polar coordinates with the origin at the center of the tape aggregate 4, it is also possible to adopt the structure of disposing the plurality of tapes 41 superposed on each other. As one angular region in the circular polar coordinates, it is possible to adopt various angular regions which are divided from 360 degrees, and equivalent to or smaller than 180 degrees, such as 90 degrees, 120 degrees, or 180 degrees.

Further, for the tapes 41, as well as the structure of being preliminarily formed so that it extends into a linear shape in a free state where the external load does not act thereon, it is also possible to adopt the structure of being preliminarily formed so that it is wound in a spiral shape in the free state. In such a case also, the plurality of tapes 41 are bundled by the plurality of bundling members 5 in the extended state, so that the arm 1 has the stiffness to keep the linear state as the aggregate of these tapes 41.

Still further, it is also possible to adopt the structure such that the plurality of bundling members 5 are not coupled to each other. In other words, in the process of extension of the arm 1, the plurality of bundling members 5 accumulated on the side of the arm paying out device 2 are individually paid out along with the tape 41 with appropriate distances. The distance between the bundling boards 5 can be set to constant or any distance with which the tape aggregate 4 can bear the predictable load.

In this case, in the arm extension part, the tape 41 is fixed to the bundling member 5. In contrast, the tape 41 is not fixed to the plurality of bundling members 5 accumulated on the side of the arm paying out device 2, and needs to pass through the bundling member 5 in the directions of both extension and contraction. As a particular configuration, it is possible to adopt a bundling member having spring characteristics in the direction curving to a plane perpendicular to the longitudinal direction of the tape aggregate 4, and provide a accumulating part for accumulating such bundling members 5 being pressed in the longitudinal direction, and for individually paying out and accommodating the bundling members 5. A screw mechanism and a latch mechanism are applicable to the operation of paying out and accommodating the bundling member.

Here, when the groove width of the guiding groove 51 of the bundling member 5 is set to the width slightly greater than the thickness of the tape 41, in the normal state, the groove width of the bundling member 5 decreases toward the tape cross-section to tighten the tape 41, and therefore, the tape is fixed against the bundling member. In contrast, in the accumulating part, the bundling member 5 is pressed so as to become planar, thereby releasing the tightening of the tape 41 to allow the tape 41 to pass. Such a function is the same as the fixing/releasing function of a gondola for the power rope for transportation in the ropeway.

It is appreciated that the structure of the accumulating part is not limited to the structure such that the plurality of bundling members 5 are accumulated on the side of the arm paying out device 2 and individually paid out, but it is also possible to adopt the structure such that the plurality of bundling members 5 are accumulated on the side of the arm tip part and individually paid out, or the structure of the combination of these structures.

What is claimed is:

1. A manipulator mechanism, comprising:
   an arm having a tip part and a base end part, the arm comprising a tape and a plurality of bundling members, and
   an arm paying out device to which the tape is coupled for winding and paying out the arm, the arm paying out device comprising at least one rotatable reel and a stationary surface, wherein the tape has a substantially arcuate cross-section, comprising a continuous elastic material, and is folded about the tip part of the arm so as to form two substantially parallel tape portions extending in a longitudinal direction from the tip part to the base end part of the arm, wherein the tape includes a first end which is connected to the at least one rotatable reel of the arm paying out device, and a second end which is connected to the stationary surface of the arm paying out device, wherein an intermediate portion of the tape, disposed between the first end and the second end, folds about the tip part of the arm, wherein the plurality of bundling members are attached to the tape between the tip part and the base end part with spaces therebetween in the longitudinal direction of the tape to bundle the two substantially parallel tape portions, each bundling member comprising a pair of apertures through which the two substantially parallel tape portions pass when the arm is paid out by the at least one rotatable reel of the arm paying out device, wherein the arm can be wound and paid out by rotating the at least one rotatable reel of the arm paying out device, and wherein the arm paying out device further comprises a tape pressing mechanism surrounding an outer peripheral surface of the tape and pressing the outer peripheral surface from an entire periphery thereof to prevent swelling of the tape.

2. The manipulator mechanism according to claim 1, wherein an open space is formed at a position corresponding to a center of the two substantially parallel tape portions.

3. The manipulator mechanism according to claim 1, wherein the tip part of the arm is provided with a guiding mechanism guiding a direction change of the continuous elastic material by 180 degrees.

\* \* \* \* \*